(12) United States Patent
Makino

(10) Patent No.: US 8,345,110 B2
(45) Date of Patent: Jan. 1, 2013

(54) IMAGE PROCESSING APPARATUS AND STORAGE MEDIUM

(75) Inventor: Tetsuji Makino, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 484 days.

(21) Appl. No.: 12/717,292

(22) Filed: Mar. 4, 2010

(65) Prior Publication Data
US 2010/0225777 A1 Sep. 9, 2010

(30) Foreign Application Priority Data

Mar. 6, 2009 (JP) .................................. 2009-053899

(51) Int. Cl.
*H04N 5/228* (2006.01)
*H04N 5/14* (2006.01)

(52) U.S. Cl. ...................................... 348/208.4; 348/699

(58) Field of Classification Search ............. 348/208.99, 348/208.1, 208.4, 413.1, 416.1, 699
See application file for complete search history.

(56) References Cited

U.S. PATENT DOCUMENTS

| | | | | |
|---|---|---|---|---|
| 5,408,274 A | * | 4/1995 | Chang et al. ................... | 348/700 |
| 5,706,417 A | * | 1/1998 | Adelson ......................... | 345/640 |
| 5,812,787 A | * | 9/1998 | Astle ............................. | 709/247 |
| 6,584,229 B1 | * | 6/2003 | Lim et al. ...................... | 382/243 |

FOREIGN PATENT DOCUMENTS

| | | | |
|---|---|---|---|
| JP | 63166370 A | * | 7/1988 |
| JP | 2006-109361 A | | 4/2006 |
| JP | 2007-095010 A | | 4/2007 |
| JP | 2008-182374 A | | 8/2008 |
| JP | 2009-284411 A | | 12/2009 |

OTHER PUBLICATIONS

Korean Office Action dated Feb. 8, 2012 (and English translation thereof) in counterpart Korean Application No. 10-2010-0019920.
Chinese Office Action dated Feb. 13, 2012 (and English translation thereof) in counterpart Chinese Application No. 201010130221.2.
Japanese Office Action dated Jan. 18, 2011 and English translation thereof in counterpart Japanese Application No. 2009-053899.

* cited by examiner

*Primary Examiner* — Timothy J Henn
(74) *Attorney, Agent, or Firm* — Holtz, Holtz, Goodman & Chick, PC

(57) ABSTRACT

The image processing apparatus is provided with a subject movement data creation unit that detects the movement of subjects in a plurality of partitioned blocks that partition a screen area of moving images, and creates subject movement data that specifies a partitioned block where there is movement in the subject and the movement of the subject in that partitioned block; a still image acquisition unit that acquires still images; and a still image processor that causes the image of the still image blocks corresponding to the partitioned blocks specified by the subject movement data to move in accordance with the movement of the subject specified by the subject movement data, on the still image acquired by the still image acquisition unit using the subject movement data created by the subject movement data creation unit.

6 Claims, 6 Drawing Sheets

|  | n=1 |
|---|---|
| V1(n) | x=0, y=0 |
| V2(n) | x=0, y=0 |
| ... | ... |
| V22(n) | x=10, y=1 |
| V23(n) | x=10, y=1 |
| ... | ... |
| V149(n) | x=0, y=0 |
| V150(n) | x=0, y=0 |

FIG. 6

|  | n=min | n=min+1 | ... | n=max |
|---|---|---|---|---|
| V1(n) | x=0, y=0 | x=0, y=0 | ... | x=0, y=0 |
| V2(n) | x=0, y=0 | x=0, y=0 | ... | x=0, y=0 |
| ... | ... | ... | ... | ... |
| V22(n) | x=10, y=1 | x=8, y=0 | ... | x=10, y=1 |
| V23(n) | x=10, y=1 | x=8, y=0 | ... | x=10, y=1 |
| ... | ... | ... | ... | ... |
| V149(n) | x=0, y=0 | x=0, y=0 | ... | x=0, y=0 |
| V150(n) | x=0, y=0 | x=0, y=0 | ... | x=0, y=0 |

IMAGE PROCESSING APPARATUS AND STORAGE MEDIUM

CROSS-REFERENCE TO RELATED APPLICATION

This application claims to the benefit of Japanese Patent Application 2009-053899, filed on Mar. 6, 2009, the entire disclosure of which is incorporated by reference herein.

FIELD

This application relates generally to an image processing apparatus for processing moving images and a storage medium.

BACKGROUND

As this type of art, Unexamined Japanese Patent Application KOKAI Publication No. 2008-182374 discloses art in which through reproduced still images the main subject image is successively overlaid and displayed in chronological order showing the position tracking data on the basis of position tracking data of the main subject recorded during photography.

However, with the art disclosed in Patent Literature 1, the main subject image successively overlaid and displayed on still images is a still image of a portion cut from the still image as a whole. Consequently, the art disclosed in Patent Literature 1 had the problem of being unable to express movements of the subject itself owing to movements of the position of the main subject.

SUMMARY

The purpose of the present invention is to make it possible to express the movement of a portion of the subject itself by processing moving images acquired from live-view images.

To achieve the purpose above, the first aspect of the present invention is an image processing apparatus comprising:

a subject movement data creation unit that detects the movement of a subject in a plurality of partitioned blocks that partition a screen area of moving images, and creates subject movement data that specifies a partitioned block where there is movement in the subject and the movement of the subject in that partitioned block;

a still image acquisition unit that acquires still images; and a still image processor that causes the image of the still image blocks corresponding to the partitioned blocks specified by the subject movement data to move in accordance with the movement of the subject specified by the subject movement data, on the still image acquired by the still image acquisition unit using the subject movement data created by the subject movement data creation unit.

To achieve the purpose above, another aspect of the present invention is:

a storage medium on which a program readable by the computer of an image processing apparatus is recorded, the program allowing the computer to function as:

a subject movement data creation unit that detects the movement of subjects in a plurality of partitioned blocks that partition a screen area of moving images, and creates subject movement data that specifies a partitioned block where there is movement of the subject and the movement of the subject in that partitioned block;

a still image acquisition unit that acquires still images; and a still image processing unit that causes the images of the still image block corresponding to the partitioned blocks specified by the subject movement data to move in accordance with the movement of the subject specified by the subject movement data, on the still image acquired by the still image acquisition unit using the subject movement data created by the subject movement data creation unit.

The purpose of the present invention is to enable the movements of a portion of the subject itself to be expressed by processing moving images acquired from live-view images.

BRIEF DESCRIPTION OF THE DRAWINGS

A more complete understanding of this application can be obtained when the following detailed description is considered in conjunction with the following drawings, in which:

FIG. 6 is a drawing showing an example of the plurality of subject movement data (final data) items created by the image processing apparatus according to the embodiment of the present invention;

DETAILED DESCRIPTION

An embodiment of the present invention will be described hereafter with reference to the drawings.

In the present invention, the term "moving images" shall include compilations of still images in which the movement of the subject is discontinuous.

The image processing apparatus 1 according to this embodiment is a digital camera. The image processing apparatus according to the present invention may be realized through apparatuses other than a digital camera, such as a computer, etc.

Figure 1:
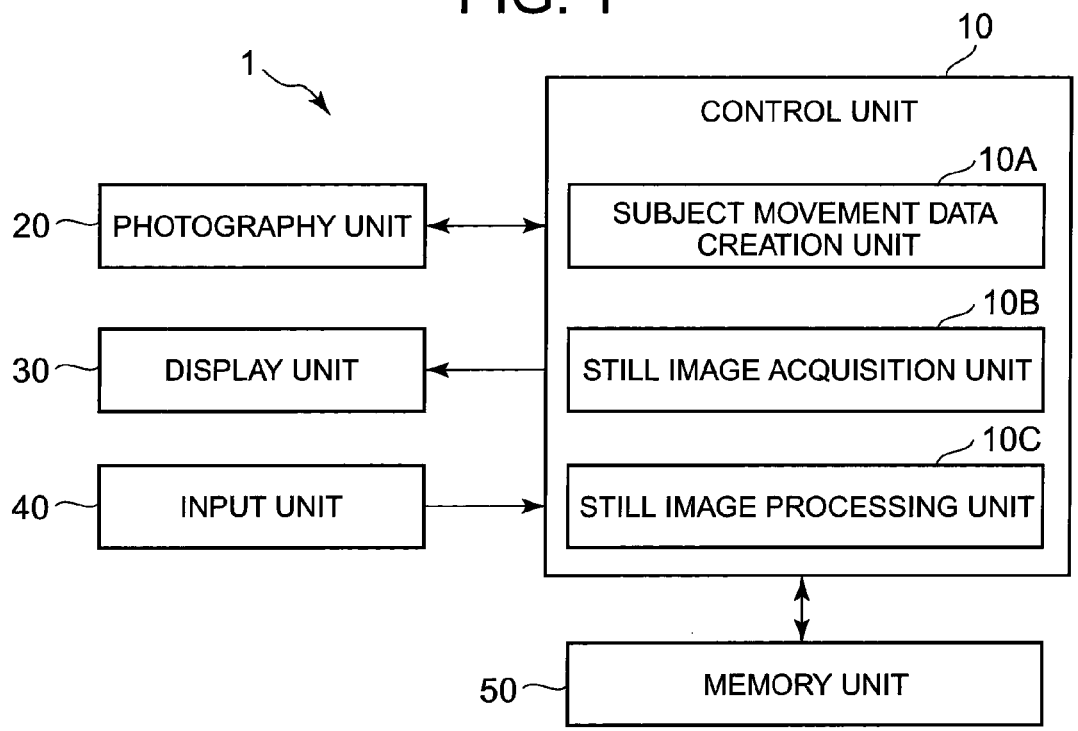
FIG. 1 is a block diagram showing the relationship of the various parts of an image processing apparatus corresponding to an embodiment of the present invention.

As shown in FIG. 1, the image processing apparatus 1 is provided with a control unit 10, a photography unit 20, a display unit 30, an input unit 40 and a memory unit 50.

The control unit 10 controls the photography unit 20 and the display unit 30. In addition, the control unit 10 displays images photographed by the photography unit 20 on the display unit 30 as live-view images. In addition, the control unit 10 displays images based on image data recorded in the memory unit 50 on the display unit 30. In addition, the control unit 10 controls the photography unit 20 and the display unit 30 on the basis of operating signals from the input unit 40. In addition, the control unit 10 is provided with a subject movement data creation unit 10A, a still image acquisition unit 10B and a still image processing unit 10C. The various components that comprise the control unit 10 accomplish the below-described image processing.

The photography unit 20 photographs the subject (the object the photography unit is photographing) under control by the control unit 10. The display unit 30 displays images under control by the control unit 10. The input unit 40 sends to the control unit 10 operating signals in accordance with input operations by the user. The memory unit 50 stores various data such as image data and subject movement data.

Figure 2:
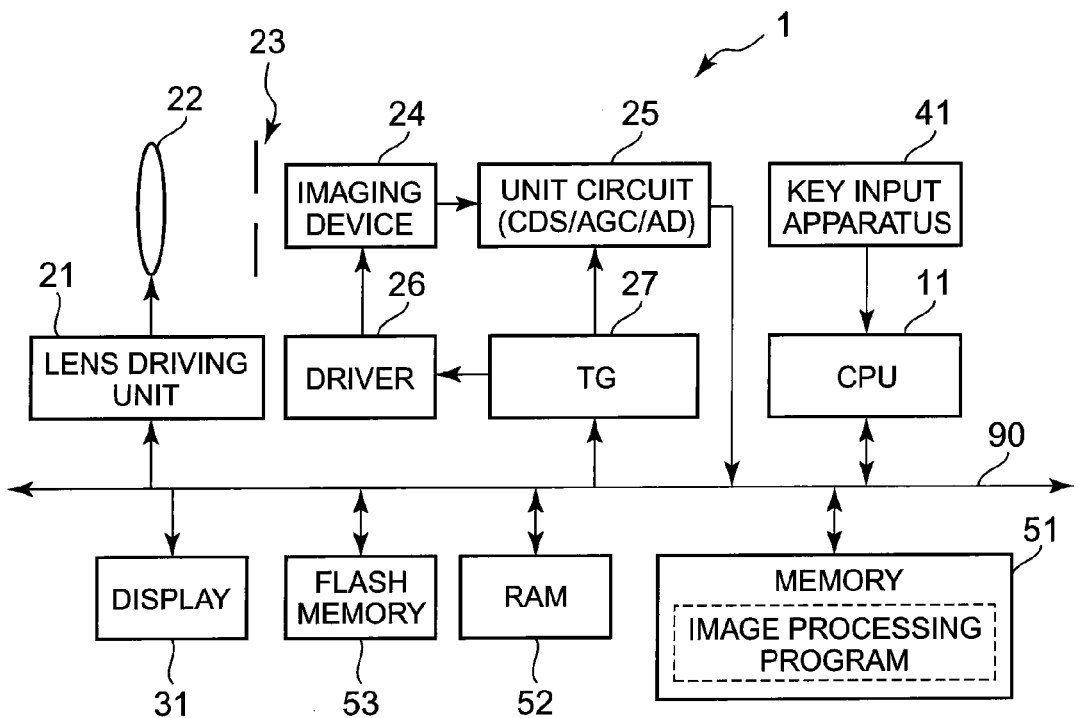
FIG. 2 is a hardware composition diagram of the image processing apparatus according to the embodiment of the present invention.
Figure 3:
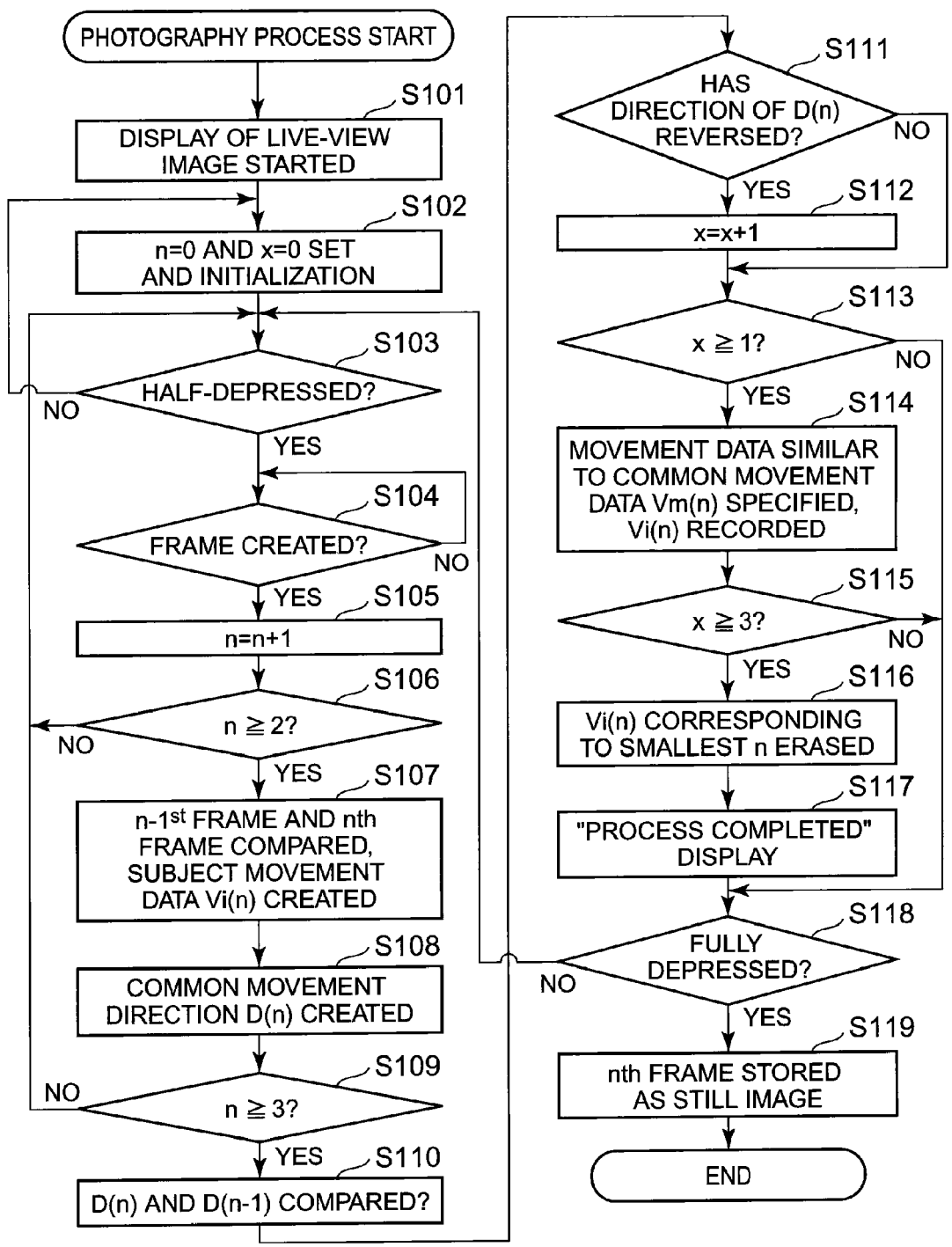
FIG. 3 is a flowchart showing the photography process accomplished by the image processing apparatus according to the embodiment of the present invention.

The hardware composition of the image processing apparatus 1 will be described hereafter. As shown in FIG. 2, the image processing apparatus 1 is provided with a CPU (central processing unit) 11, a lens driving unit 21, a photography lens 22, a diaphragm/shutter 23, an imaging device 24, a unit circuit 25, a driver 26, a timing generator (TG) 27, a display 31, a key input apparatus 41, a memory 51, a random access memory (RAM) 52, a flash memory 53 and a bus 90.

The control unit 10 in FIG. 1 is comprised of the CPU 11, which accomplishes processing through an image processing program. The photography unit 20 in FIG. 1 is composed of the lens driving unit 21, the photography lens 22, the diaphragm/shutter 23, the imaging device 24, the unit circuit 25, the driver 26 and the TG 27. The display unit 30 in FIG. 1 is composed of the display 31. The input unit 40 in FIG. 1 is composed of the key input apparatus 41. The memory unit 50 in FIG. 1 is composed of the memory 51, the RAM 52 and the flash memory 53.

The photography lens 22 is composed of a lens group comprised of a focus lens, a zoom lens, etc. The various lenses that make up the lens group are each connected to the lens driving unit 21.

The lens driving unit 21 is composed of a motor (unrepresented) for causing the focus lens and zoom lens to each move in the optical axis direction, and motor drivers (unrepresented) for causing the focus motor and the zoom motor to each move in accordance with control signals sent from the CPU 11.

The diaphragm/shutter 23 includes a driver circuit (unrepresented), and this driver circuit causes the diaphragm/shutter 23 to move in accordance with control signals sent from the CPU 11. This diaphragm/shutter 23 functions as a diaphragm and shutter. The diaphragm is a mechanism for controlling the amount of light entering from the photography lens 22, and the shutter is a mechanism for controlling the time during which light hits the imaging device 24.

The time during which light hits the imaging device 24 (exposure time) is changed by the speed of the shutter opening and closing (shutter speed). In addition, the exposure time of the imaging device 24 is changed by the diaphragm and the shutter speed.

The imaging device 24 is composed of, for example, a charge coupled device (CCD) or a complementary metal oxide semiconductor (CMOS) image sensor, or the like. The imaging device 24 is scan-driven by the driver 26 and photoelectrically converts the strength of the light in the various colors of the subject image's RGB value for each fixed period and outputs this to a unit circuit 25 as the imaging signal. The operational timing of that unit circuit 25 and the driver 26 is controlled by the CPU 11 through the TG 27. The imaging device 24 has the Bayer arrangement of color filters and also functions as an electronic shutter. The shutter speed of this electronic shutter is controlled by the CPU 11 through the driver 26 and the TG 27.

The unit circuit 25 is connected to the TG 27. The unit circuit 25 is composed of a CDS (Correlated Double Sampling) circuit that preserves the imaging signal output from the imaging device 24 through correlated double sampling, an AGC (Automatic Gain Control) circuit that accomplishes automatic gain control on the imaging signal after this sampling, and an A/D converter that converts the analog imaging signal after automatic gain control to a digital signal. The imaging signal of the imaging device 24 is sent to the CPU 11 as a digital signal after passing through the unit circuit 25.

The CPU 11 has the function of accomplishing image processing on the digital signal (image original data) sent from the unit circuit 25, including gamma correction, an interpolation process, a white balance process, a histogram creation process and a luminance color difference signal (YUV data) creation process. The CPU 11 is also a one-chip microcomputer that controls the various components of the image processing apparatus. In particular, in this embodiment the CPU 11 accomplishes the below-described image processing.

The control program necessary for the CPU 11 to control the various components, the image processing program needed for the CPU 11 to execute the below-described image processing and necessary data are stored in the memory 51. The control program and image processing program are expanded in the RAM 52. The CPU 11 acts in accordance with the control program and image processing program expanded in the RAM 52. In particular, the CPU 11 accomplishes the below-described image processing in accordance with the image processing program.

The RAM 52 is composed of DRAM (Dynamic Random Access Memory) or SRAM (Static Random Access Memory) or the like. The RAM 52 is used as a buffer memory for temporarily storing image data sent to the CPU 11 after imaging by the imaging device 24. In addition, the control program and image processing program are expanded in the RAM 52. In addition, the RAM 52 is used as working memory for the CPU 11.

The display 31 for example contains a color LCD (Liquid Crystal Display) and driver circuits for such. Based on control by the CPU 11, the display 31 displays the subject imaged by the imaging device 24 as a live-view image when in the photography standby state. When playing back recorded images, the display 31 displays images created from image data stored in the flash memory 53, under the control of the CPU 11.

The flash memory 53 is a storage medium that preserves subject movement data, image data on the image imaged by the imaging device 24, etc.

The key input apparatus 41 contains a plurality of operation keys, such as a two-stage operable shutter button that can be halfway depressed or fully depressed, a mode switching key, an arrow key, a zoom key, a menu key and the like, and an operation signal corresponding to key operation by the user is output to the CPU 11.

The bus 90 is a transfer circuit that transfers data exchanged among the various components connected to the bus 90.

The constituent elements in FIGS. 1 and 2 constitute a single image processing apparatus 1. However, at least a portion of the functions of the above-described constituent elements may also be provided externally to the image processing apparatus 1. For example, the display unit 30 (display 31) may be provided externally to the image processing apparatus 1 (for example, a computer monitor or the like). In addition, the memory area of the memory unit 50 (memory 51, RAM 52 and flash memory 53) may be held at least in part in an external device (for example, a server). In addition, the photography unit 20 may be provided externally to the image processing apparatus 1 (for example, a camera (when the image processing apparatus 1 is a computer) or the like).

The image processing program may be downloaded onto a computer via communications circuits such as the Internet. In this case, that computer becomes the image processing apparatus 1. In addition, the image processing program may work together with the OS (operating system) to cause the below-described processes to be executed by the CPU 11. In addition, the image processing program may be recorded on a storage medium (for example, RAM, ROM, CD-R, DVD-R, hard disk or flash memory) readable by various computers. The image processing program is a program computers can read, and the storage medium on which this program is recorded becomes the computer program product.

The photography process out of the image processing method accomplished by the image processing apparatus 1 according to the present embodiment will be described hereafter with reference to FIGS. 3 through 6. This photography process starts when the user (operator) of the image processing apparatus 1 accomplishes a predetermined operation using the input unit 40. For example, the user can operate the input unit 40 (for example, the mode switch key) so that the still image photography mode is set on the image processing apparatus 1, and this process then starts. The control unit 10 (CPU 11) of the image processing apparatus 1 accomplishes this photography process, but in the description hereafter an explanation is provided in which the subject movement data creation unit 10A and the still image acquisition unit 10B provided in the control unit 10 accomplish processing. In addition, this image processing may be concluded midway by the user operating the input unit 40.

The subject movement data creation unit 10A starts causing a live-view image to be displayed on the display unit 30 (step S101). Specifically, the subject movement data creation unit 10A causes the process for imaging the subject to be started in the photography unit 20. It creats the frame image data of the luminance color difference signal from the original data (image original data) of the successively imaged frame images. It records the created frame image data of the luminance color difference signal in the buffer memory (RAM 52). It causes the image created from the stored frame image data of the subject to be displayed on the display unit 30. The frame rate during this process is, for example, 30 frames per second (fps).

The subject movement data creation unit 10A sets n=0 and x=0 and also accomplishes initialization by erasing the below-described intermediate data used in this image processing (step S102). Here, n specifies the order of frame images and x specifies the below-described number of reversals in the common movement direction contained in the movement data.

The subject movement data creation unit 10A determines whether or not the shutter button provided in the input unit 40 is in a half-depressed state (step S103). When the shutter button provided in the input unit 40 is halfway depressed by the user, the input unit 40 outputs an operation signal corresponding to this half-depressing to the subject movement data creation unit 10A. When this operation signal is sent, the subject movement data creation unit 10A determines that the shutter button is in a half-depressed state.

When the subject movement data creation unit 10A determines that the shutter button is in a half-depressed data (step S103; YES), the unit advances to the process in step S104. In addition, when the subject movement data creation unit 10A determines that the shutter button is not in a half-depressed state (for example, has not been halfway depressed, or half-depressing has been released) (step S103; NO), the unit returns to the process in step S102. In this manner, the subject movement data creation unit 10A waits until the shutter button is halfway depressed by the user. In addition, when half-depressing is cleared during the interval from step S104 through step S118, the subject movement data creation unit 10A returns to the start state (step S102) of this imaging process.

The subject movement data creation unit 10A determines whether or not the frame image data explained in step S101 above has been created (step S104). When the frame image data has been created (step S104; YES), the subject movement data creation unit 10A advances to step S105. In addition, when the frame image data has not yet been created (step S104; NO), the subject movement data creation unit 10A returns to step S104. In this manner, the subject movement data creation unit 10A waits until the frame image data is created.

The subject movement data creation unit 10A sets n=n+1, and stores (records) the nth frame image data in the memory unit 50 (working memory (RAM 52)) as intermediate data (step S105). In this manner, with the shutter in a half-depressed state, the first, second, . . . , $n-2^{nd}$, $n-1^{st}$ and nth frame period (period when the frame image data is created) are come in order each time the above-described frame rate elapses. Furthermore, the frame image data created at the first, second, . . . , $n-2^{nd}$, $n-1^{st}$ and nth frame period become the first, second, . . . , $n-2^{nd}$, $n-1^{st}$ and nth frame image data. That is to say, when the nth frame period is come, the nth frame image data is recorded. The subject movement data creation unit 10A successively stores the nth frame image data in the memory unit 50, but at this time the $n-2^{nd}$ frame image data may be erased. Through this, process efficiency can be realized. The image of the nth frame image data is displayed on the display unit 30, for example.

The subject movement data creation unit 10A determines whether or not n is two or more (step S106). That is to say, the subject movement data creation unit 10A determines whether it has stored two or more items of frame image data in the memory unit 50 (whether the second or later frame image has been created).

When n is less than 2 (step S106; NO), the subject movement data creation unit 10A cannot do the below-described comparison of frame image data and consequently returns to step S103. When n is 2 or greater (step S106; YES), the subject movement data creation unit 10A can accomplish the below-described comparison of frame image data and thus advances to step S107.

The subject movement data creation unit 10A compares the $n-1^{st}$ frame image data and the nth frame image data stored in the memory unit 50 and creates the nth subject movement data Vi(n) (step S107). A concrete example of this process will be described with reference to FIGS. 4 and 5. Here, the above-described process will be described using the image (frame image) of the frame image data in order to facilitate understanding, but the subject movement data creation unit 10A accomplishes a process corresponding to the above-described process on the data using frame image data.

Figures 4, 5:
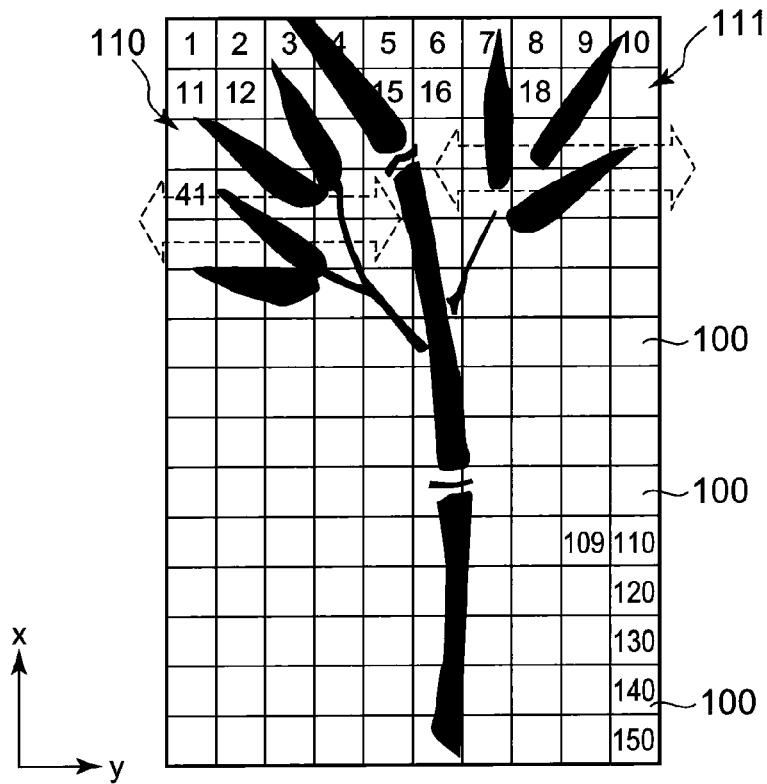
FIG. 4 is a drawing showing moving images for explaining image processing accomplished by the image processing apparatus according to the embodiment of the present invention.
FIG. 5 is a drawing showing an example of the subject movement data created by the image processing apparatus according to the embodiment of the present invention.

As shown in FIG. 4, the frame image is partitioned into 150 (the number may be appropriately determined) partitioned blocks 100. The figures in the partitioned blocks 100 in FIG. 4 are figures for specifying the position of the partitioned blocks 100 (for example, if the figure is 1, it is the first partitioned block 100), and do not comprise the frame image (that is to say, part of the subject).

The sets 110 and 111 of bamboo leaves that are a portion of the subject each similarly move back and forth to the left and right due to the effects of wind or the like (see the dotted arrows in FIG. 4). When the n−1$^{st}$ and nth frame image are compared, the subject in the partitioned blocks 100, that is to say the bamboo leaves (for example, the 22$^{nd}$ and 23$^{rd}$ partitioned blocks 100), are moving to the left and right, and consequently the bamboo leaves (subject) in the partitioned blocks 100 are moving. In addition, for example the subject in the first partitioned block 100 may not be moving. Hence, when the n−1$^{st}$ and nth frame images are compared, the movement data for the subject in each of the partitioned blocks 100 is specified. This movement data can be computed using a commonly known method. The commonly known method may be, for example, optical flow. An example of the movement data could be a movement vector.

The sets of movement data obtained in this manner become the subject movement data Vi(n) (see FIG. 5). The subject movement data Vi(n) corresponds to data specifying the various partitioned blocks 100 and movement data in the various partitioned blocks 100. Data specifying the various partitioned blocks 100 is V1(n) through V150(n) in FIG. 5. Here, the "i" in Vi(n) is the number of the partitioned block. For example, V1(n) expresses the first partitioned block because i=1. Data specifying the various partitioned blocks 100 may be data that can specify the various partitioned blocks, and for example may be data specifying a number corresponding to the position of the partitioned block. In addition, the movement data is data indicating the degree to which the image moves in the x direction and the y direction, where the x axis is the horizontal direction of the frame image and the y axis is the vertical direction of the frame image, for example (see the coordinate axes in FIG. 4). That is to say, the movement data is data that can specify the direction of the subject's movement and the distance the subject moved in the partitioned blocks 100, for example. For example, in FIG. 5 the movement data is expressed in the form x=10 and y=1. The numerical value for x and y is the number of pixels. The direction toward the opposite side with respect to the x direction would be indicated by x values being negative. In addition, the direction toward the opposite side with respect to the y direction would be indicated by y values being negative. As shown in FIG. 5, in the 22$^{nd}$ partitioned block 100, x=10 and y=1 is expressed by V22(n), so the subject in the 22$^{nd}$ partitioned block 100 has moved 10 pixels in the x direction and 1 pixel in the y direction. This movement data can also express that the subject is not moving. In this case, the expressions are x=0 and y=0 (for example, see V1(n) in FIG. 5).

The subject movement data creation unit 10A stores the subject movement data Vi(n) in the memory unit 50 (working memory (RAM 52)) as intermediate data. In this manner, the subject movement data creation unit 10A compares the n−1$^{st}$ frame image data and the nth frame image data stored in the memory unit 50, and creates and stores the nth subject movement data Vi(n) that specifies in each partitioned block the movement data specifying movement of the subject in each partitioned block 100. Specifying the movement of the subject, besides the case of uniquely specifying the subject's movement, may for example include the case of specifying the subject's movement in a given range. For example, when the subject has moved within the range of x=0.6 to 1.4 and y=0.6 to 1.4, that movement data may be x=1 and y=1. In this manner, movement of the subject within a given range may be specified.

The subject movement data creation unit 10A creates a common movement direction D(n) specifying the common direction in which the subject moves as intermediate data based on the subject movement data Vi(n) and stores this in the memory unit 50 (working memory (RAM 52)) (step S108). The common movement direction is the direction specifying the direction in which the subject moves that is most common among the directions in which the subject moves (can be specified from the above-described x and y values) contained in the various movement data of the partitioned blocks 100. The movement direction being common means that the movement directions completely match one another or are within a prescribed range (for example, ±5 degrees). In the case where the directions are common when the directions are within a prescribed range (for example, ±5 degrees), the central direction within that prescribed range, for example, is the common direction. In the case where the directions are common when the directions are within a prescribed range (for example, ±5 degrees), for example 360 degrees is divided into 36 parts and the number of movement directions in each of the division ranges (ranges of 10 degrees) is specified and the common direction is the center direction in the range to which the largest number of movement directions belong. By creating a common movement direction, the subject movement data creation unit 10A can specify in which direction at least part of the subject is primarily moving in the image as a whole. In particular, the present embodiment applies to cases in which a portion of the subject (in particular a plurality of parts) moves back and forth through roughly common movement due to wind or the like.

The subject movement data creation unit 10A determines whether n≧3 (step S109). When n is less than 3 (step S109; NO), the subject movement data creation unit 10A returns to the process in step S103. When n is at least 3 (step S109; YES), the subject movement data creation unit 10A advances to step S110. In this manner, the subject movement data creation unit 10A repeats steps S103 through S109 until three or more frame image data items have been acquired. The subject movement data creation unit 10A can determine the below-described reversal of the common movement direction if three or more items of frame image data can be acquired.

The subject movement data creation unit 10A compares the nth D(n) and the n−1$^{st}$ D(n−1) (step S110). Specifically, the subject movement data creation unit 10A compares the respective directions specified by D(n) and D(n−1) stored in the memory unit 50.

The subject movement data creation unit 10A determines whether the direction specified by the nth D(n) is reversed with respect to the direction specified by the n−1$^{st}$ D(n−1) (step S111). For example, the subject movement data creation unit 10A determines whether the direction specified by D(n) is the opposite direction from the direction specified by D(n−1). If it is opposite, D(n) is said to be reversed, and if it not opposite, D(n) is said to not be reversed. The opposite direction from the direction specified by D(n−1), besides being the direction 180 degrees from the direction specified by D(n−1), may also be a direction with a specified range centered on the 180-degree direction (for example, a direction with the range of 5 degrees from the center direction). When it is determined that the direction specified by the nth D(n) is reversed (step S111; YES), the subject movement data creation unit 10A advances to step S112 and sets x=x+1. Through this, the number of reversals in the common movement direction is counted. In addition, when it is determined that the direction specified by the nth D(n) is not reversed (step S111; NO), the subject movement data creation unit 10A advances to step S113. In this manner, the subject movement data creation unit 10A can count how many times the main part of at least a portion of the subject reverses in the image as a whole through the number of reversals in the common movement direction.

The subject movement data creation unit 10A determines whether or not $x \geq 1$ (step S113). The time when x=1 is the time when the direction specified by the common movement data has reversed for the first time from the time when the shutter was half-depressed. At this point in time, the subject is the most displaced from the center in its back-and-forth motion. By capturing the back-and-forth motion of the subject from the point in time of maximum displacement, the period of back-and-forth motion can be learned. In addition, through this it is possible to efficiently capture the back-and-forth motion of the subject.

When it is determined that $x \geq 1$ (step S113; YES), the subject movement data creation unit 10A stores in the memory unit 50 (working memory (RAM 52)) only movement data similar to the common movement data Vm(n) out of the Vi(n) (the set of movement data specified from all of the partitioned blocks 100) that is the nth subject movement data (step S114). That is to say, in step S114, the subject movement data creation unit 10A stores in the memory unit 50 the movement data specified only in the partitioned blocks 100 in which movement data similar to the common movement data Vm(n) is specified. On the other hand, in step S114, the subject movement data creation unit 10A does not store in the memory unit 50 the specified movement data Vi(n) for the partitioned blocks 100 in which movement data not similar to the common movement data Vm(n) is specified, but stores in the memory unit 50 x=0 and y=0 as the movement data. The common movement data Vm(n) is the movement data in the nth subject movement data Vi(n) that has the largest number matching out of the movement data that mutually match direction and magnitude (this can be specified from the above-described x and y values). In addition, movement data similar to the common movement data Vm(n) is movement data out of the nth subject movement data Vi(n) whose direction is within a prescribed range (for example, ±5 degrees) of the direction of the common movement data Vm(n) and whose size is within a prescribed range (for example, ±5%) of the size of the common movement data Vm(n). In this manner Vi(n), which is subject movement data specifying movement data similar to the common movement data (movement data within a prescribed range of the common movement data, and movement data corresponding to back-and-forth motion), is recorded as final data.

In the repeatedly executed step S114, the subject movement data creation unit 10A stores the subject movement data Vi(n) in memory unit 50 so that the chronological order, that is to say the order of n values, is understood. In addition, when $x \geq 1$ is not true (step S113; NO), the subject movement data creation unit 10A advances to step S118 because the time for capturing back-and-forth movement of the subject has not arrived.

The subject movement data creation unit 10A determines whether $x \geq 3$ (step S115). When it is determined that $x \geq 3$ (step S115; YES), the subject movement data creation unit 10A erases from the memory unit 50 the subject movement data Vi(n) corresponding to the smallest n recorded as final data (step S116). In addition, when it is determined that $x \geq 3$ is not true (step S115; NO), the subject movement data creation unit 10A advances to step S118. In this manner, the subject movement data Vi(n) corresponding to n from immediately after $x \geq 1$ until immediately before $x \geq 3$ is recorded as final data in the memory unit 50, and through this the subject movement data corresponding to the n (frame number) of one period is obtained. In addition, for n after $x \geq 3$, it is possible to obtain the subject movement data of the latest period by erasing from the memory unit 50 the subject movement data Vi(n) corresponding to the smallest n. In this manner, it is possible to efficiently obtain the subject movement data of one period.

The subject movement data creation unit 10A displays on the display unit 30 a display indicating that the process has been completed. In this manner, the subject movement data creation unit 10A notifies the user that the first image process is concluded (step S117). That is to say, the subject movement data creation unit 10A notifies the user that it is possible to reproduce images to which the back-and-forth movement of the still image has been added.

The subject movement data creation unit 10A determines whether the shutter button provided on the input unit 40 is fully depressed (step S118). When the shutter button provided on the input unit 40 is fully depressed by the user, the input unit 40 outputs to the subject movement data creation unit 10A an operation signal corresponding to this full pressing. When this operation signal is sent, the subject movement data creation unit 10A determines that the shutter button is completely depressed. When it is determined that the shutter button is completed depressed (step S118; YES), the subject movement data creation unit 10A advances to step S119. In addition, when it is determined that the shutter button is not completely depressed (step S118; NO), the subject movement data creation unit 10A returns to step S103. In this manner, the subject movement data creation unit 10A repeats the above process until the user photographs a still image.

When the subject movement data creation unit 10A determines that the shutter button is completely depressed (step S118; YES), the still image acquisition unit 10B acquires the nth frame image data from the subject movement data creation unit 10A and stores this data as the final data's still image (still image data) in the memory unit 50 (working memory (RAM 52)) (step S119). Furthermore, the subject movement data creation unit 10A makes a correspondence between the still image data stored in the memory unit 50 (the still image that the photography unit acquired) and the subject movement data Vi(n) in chronological order stored in the memory unit as the final data, and stores this as the final data in the memory unit 50 (flash memory 53).

As shown in FIG. 6, the plurality of subject movement data items in chronological order is composed of a set of subject movement data from n=min to n=max. The subject movement data of n=min is the oldest of the plurality of subject movement data items Vi(n) that is final data (the data with the value of n smallest), while the subject movement data of n=max is the newest (the data with the value of n largest).

Figure 7:
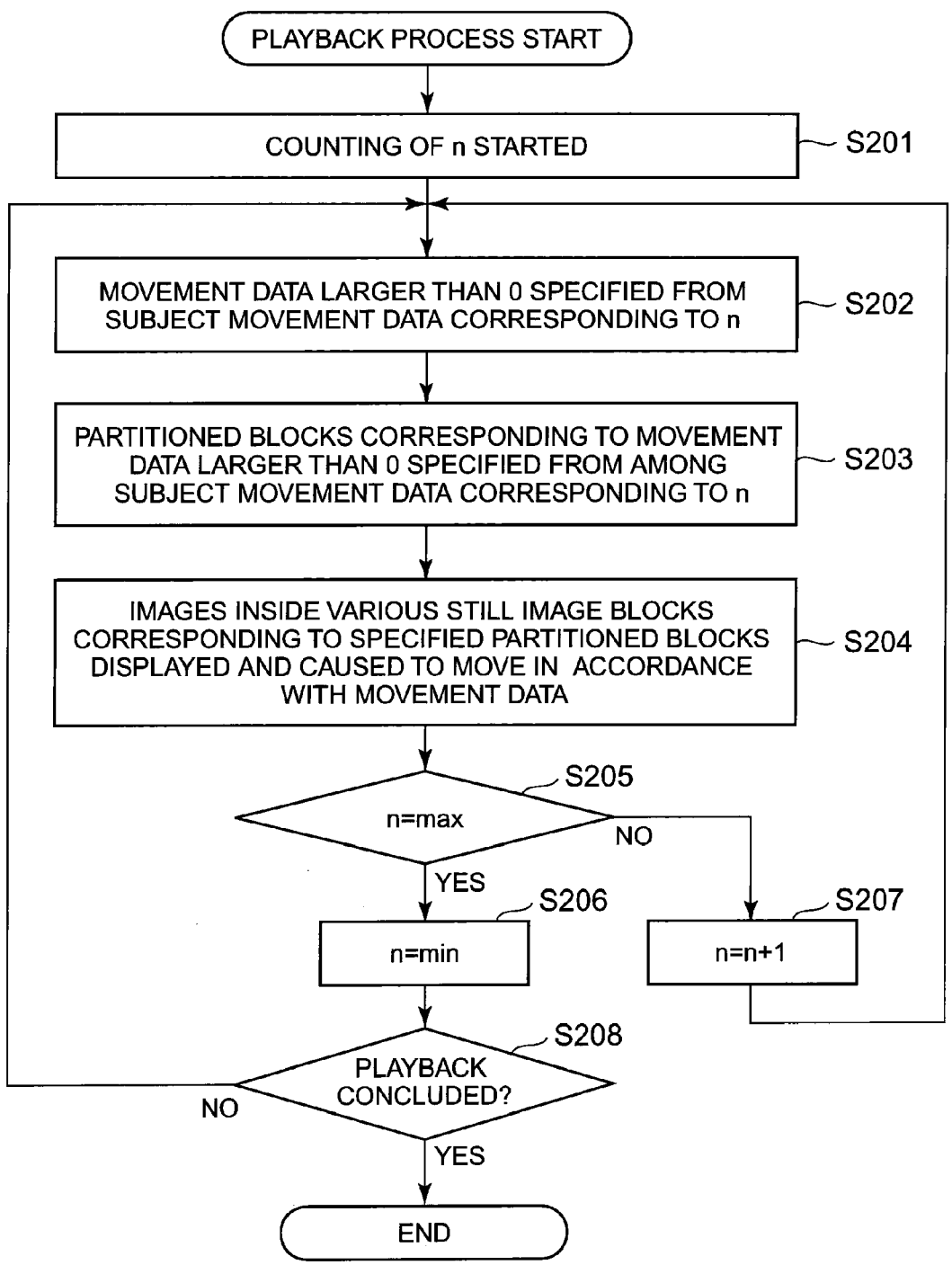
FIG. 7 is a flowchart showing the playback process accomplished by the image processing apparatus according to the embodiment of the present invention.

The playback process in the image processing method accomplished by the image processing apparatus 1 according to this embodiment will be described hereafter with reference to FIGS. 7 and 8. This playback process starts when the operator of the image processing apparatus 1 accomplishes a predetermined operation using the input unit 40. For example, this process starts when the user operates the input unit 40 (for example, the mode switching key or the like) and playback of a specific still image is set on the image processing apparatus 1. At this time, the control unit 10 creates a still image from the still image data recorded as final data on the memory unit 50 and displays this on the display unit 30. The control unit 10 of the image processing apparatus 1 (CPU 11) accomplishes this playback process, but in the below description the still image processing unit 10C accomplishes this process. In addition, this playback process may be concluded midway by the user operating the input unit 40.

The still image processing unit 10C sets n=min and starts the n count (step S201).

The still image processing unit 10C acquires from the memory unit 50 subject movement data corresponding to n from the subject movement data recorded in correspondence with the still image data, and specifies movement data having a value larger than 0 from this subject movement data (for example, movement data for which at least one out of x and y is non-zero) (step S202). For example, in FIG. 6 when n=min the movement data V22(n) and V23(n) are specified. The subject movement data may be read out in plurality from the RAM 52 in the memory unit 50, or may be read out one at a time for each process in steps S202 through S204.

The still image processing unit 10C specifies the partitioned blocks 100 corresponding to the movement data having a value larger than 0 from among the subject movement data corresponding to this n (step S203). For example, in FIG. 6, when n=min, the partitioned blocks 100 corresponding to V22(n) and V23(n) are specified.

The still image processing unit 10C specifies in the still image the various still image blocks corresponding to the various partitioned blocks 100 specified in step S203, and causes the images in the specified still image blocks to move in response to the various movement data specified in step S202 (step S204). For example, in FIG. 6, when n=min, the images of the various still image blocks respectively corresponding to (for example having the same position and shape as) the various partitioned blocks 100 corresponding to V22(n) and V23(n) are caused to move on the still image displayed on the display unit 30 by the movement distance and movement direction specified by the various movement data in V22(n) and V23(n) (for example, 10 pixels in the x direction and 1 pixel in the y direction).

This movement of the image of the still image block will be described in detail hereafter with reference to FIG. 8. The various still image blocks 200A through 2001 in FIG. 8 have the same shape as the partitioned blocks 100 (see FIG. 4) and also have the same positions. The image in the still image block 200E (the block where hatching is implemented) is caused to move for example as shown in FIG. 8 on the basis of the above movement data. Here, the single still image block 200E moves, but the movement principle is the same even if a plurality of still image blocks move.

Figure 8:
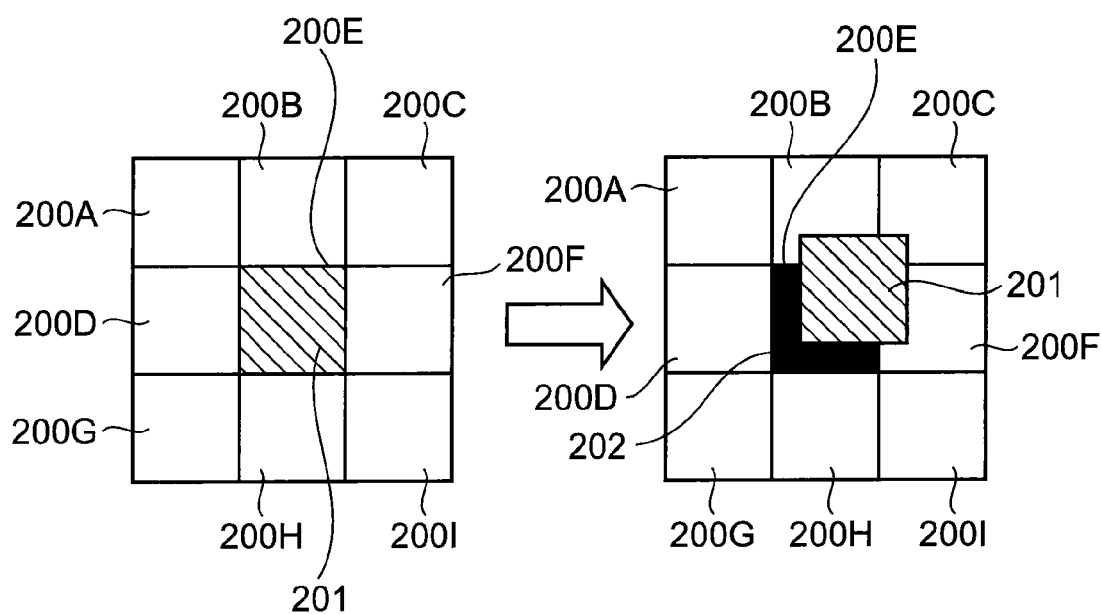
FIG. 8 is a drawing used to explain the movement of the image of the still image block accomplished by the image processing apparatus according to the embodiment of the present invention.

As shown in FIG. 8, when the image 201 (the region where hatching occurs) of the still image block 200E moves, the vacant region 202 (the region painted block) is created. Consequently, it is necessary to supplement the vacant region 202 with some kind of image.

The still image processing unit 10C supplements the vacant region 202 through the below method, for example. First, the various pixel data of the still image blocks 200D, 200F and 200H neighboring the vacant region 202 (for example, the luminance color difference value) is specified. Next, the average value (for example, the luminance color difference value) of the image data of the post-movement image 201, the image data of the still image block 200D, the image data of the still image block 200F and the image data of the still image block 200H is computed, and this computed average value becomes the image data of this vacant region 202. The still image processing unit 10C supplements the vacant region 202 in this manner.

The still image processing unit 10C determines whether n=max (step S205). If n max (step S205; YES), movement of the image of the still image block has been accomplished in accordance with one period of subject movement data, so the unit advances to step S206. Through this, at least a portion of the subject in the still image displayed on the display unit 30 has moved back and forth once on the still image. In addition, if n does not equal max (step S205; NO), the still image processing unit 10C sets n=n+1 (step S207) and returns to step S202. Through this, playback on the still image is accomplished until at least a portion of the subject of the still image displayed on the display unit 30 moves back and forth once on the still image.

The still image processing unit 10C sets n=min (step S206) and determines whether there was a playback end instruction by a predetermined operation key or the like provided on the input unit 40 being operated (step S208). When the user does an operation to end playback using the input unit 40, the input unit 40 outputs to the still image processing unit 10C an operation signal corresponding to playback end. When this operation signal has been sent, the still image processing unit 10C determines that there was a playback end instruction. When it is determined that there was a playback end instruction (step S208; YES), the still image processing unit 10C ends the playback process. In addition, when it is determined that there was no playback end instruction (step S208; NO) the still image processing unit repeats the above-described playback process. Through this, at least a portion of the subject of the still image moves back and forth multiple times.

The process described above (for example, see steps S107, S114, S116, etc., above) is one example of the process the subject movement data creation unit 10A accomplishes for detecting movement of the subject in each of the plurality of partitioned blocks 100 that partition the screen area of the moving images, and creating subject movement data specifying the partitioned blocks 100 where there was movement of the subject and the movement data in those partitioned blocks 100. The subject movement data may for example be data specifying the partitioned blocks 100 where there was movement of the subject and the movement of the subject in those partitioned blocks 100. The subject movement data for example may be data composed of partitioned block specifying data specifying the partitioned blocks 100 (data specifying the position of the partitioned blocks 100 in V22(n) of FIG. 5, for example) and movement specifying data (for example, data indicated x=10 and y=1). In addition, the process explained above (for example, see step S119) is one example of the process accomplished by the still image acquisition unit 10B to acquire the still image. In addition, the process explained above (see steps S202 through S204) is one example of a process that the still image processing unit 10C accomplishes for causing the block image 201 of the still image block corresponding to the partitioned blocks 100 in which subject movement data is specified on the still image acquired by the still image acquisition unit 10B to move in accordance with the movement of the subject specified by the subject movement data, using the subject movement data created by the subject movement data creation unit 10A. In the above embodiment, the still image processing unit 10C accomplishes processing by displaying the still image on the display unit 30, but this process may be accomplished with data and without making a display on the display unit 30.

Causing the image 201 of the still image block to move in accordance with movement of the subject specified by the subject movement data is called movement of the image 201 by causing the same movement as the movement of the subject specified by the subject movement data, or movement by a method restricted to within a prescribed range, even if such is not the same. In the above description, the image 201 is caused to have the same movement as the movement of the subject specified by the subject movement data.

In addition, in the above embodiment, the still image is acquired last, but the still image may also be acquired first in the photography process. That is to say, the still image (still image data) acquired by the still image acquisition unit 10B may be the frame image (data) when n=1. In this case, the subject movement data is stored as final data in the memory unit 50 in order starting with n=1. In addition, in this case the back-and-forth motion of the subject need not be detected. Here n items of subject movement data Vi(n) are created in a predetermined time, and the image in the still image block is caused to move on the still image in accordance with the movement data specified by the n items of subject movement data Vi(n) that were created.

As described, with the present embodiment (appropriately including the variations described above; the same hereafter), subject movement data is created specifying the partitioned blocks 100 where there was movement of the subject and movement data in those partitioned blocks 100, and the image 201 of the still image blocks corresponding to the partitioned blocks 100 specified by the subject movement data is caused to move on the still image in accordance with movement of the subject specified by the subject movement data. Through this, the image processing apparatus 1 according to the present embodiment can reproduce the movement of a small region constituting a portion of the subject using only one frame of still images even when the subject continues to stop at the same position. In addition, because the movement of at least a portion of the subject can be expressed using only one frame of still image data, moving image data with large data volume comprised of a plurality of still image data items is unnecessary when expressing movement of the subject. As a result, it is possible to obtain an image that can express movement of the subject a portion of which is stopped at the same position, while controlling the data volume of the image data. In addition, it is possible to process moving images so that expression of only movement of a portion of the subject becomes possible. In addition, it is possible to provide an image giving a new impression by causing the image as a whole within the still image block to move. Furthermore, it is possible to reproduce movement of the subject in a plurality of individual, separated regions.

In addition, in the present embodiment x=0 and y=0 are stored in the memory unit 50 as movement data for the partitioned blocks 100 where movement data not similar to the common movement data Vm(n) is specified so that only movement data similar to the common movement data Vm(n) is stored in the memory unit 50 when creating the subject movement data in the photography process. Through this, the movement of only the subject (for example, movement of the bamboo leaves shown in FIG. 4) taken in the partitioned blocks 100 in which movement data similar to the common movement data Vm(n) is specified at the time of the photography process is reproduced on the still image at the time of playback processing. Consequently, movement of the subject (for example, a car moving in a straight line at extremely high speed compared to the movement of the bamboo leaves shown in FIG. 4, although such is unrepresented) captured in the partitioned blocks 100 in which movement data greatly differing from the common movement data Vm(n) is specified is not expressed on the still image at the time of playback processing. Accordingly, in playback processing, as long as movement data of the subject (the above-described bamboo leaves, etc.) that periodically moves back and forth is similar to the common movement data, only that periodic back-and-froth motion of the subject is repeatedly reproduced on the still image, so movement of a subject (the above-described car, etc.) that does not have periodic back-and-forth motion is not reproduced. As a result, it is possible to avoid the situation of giving the user the discomfort of a subject that did not have periodic motion at the time of the photography process having periodic movement on the still image at the time of playback processing.

In addition, when the subject movement data is created in the photography process, the movement data specified from all of the partitioned blocks 100 is stored in the memory unit 50 and immediately after the start of the playback process, whether or not the respective movement data of all of the partitioned blocks 100 reverses in the back-and-forth movement of one period (Vi(min)–Vi(max)) is confirmed, and movement data for the partitioned blocks 100 in which the movement data does not reverse may be changed to x=0 and y=0, that is to say the size of the movement data is changed to 0. By so doing, when for example a subject was moving linearly without periodic back-and-forth motion, the movement of the subject (for example, the above-described car, etc.) that was moving linearly is not reproduced during playback time, even when the subject was captured in the partitioned blocks in which there was movement at the time of the photography process. Through this, it is possible to avoid the situation of giving the user the discomfort of a subject that did not have periodic motion at the time of the photography process having periodic movement on the still image at the time of playback processing. The method for confirming whether or not the respective movement data of the partitioned blocks 100 reverse during periodic back-and-forth motion is by successively confirming in the respective partitioned blocks 100 the respective directions indicated by adjacent movement data in chronological order, and if the directions respectively indicated by the adjacent movement data in chronological order are opposite, the adjacent movement data in chronological order has reversed, while if it is not opposite, the adjacent movement data in chronological order has not reversed. This opposite direction may be the direction such that the directions respectively indicated by the adjacent movement data in chronological order are 180 degrees apart, or may be a direction within a prescribed range (for example, a direction within a range of 5 degrees from the central direction) centered on the direction in which the directions respectively indicated by the adjacent movement data in chronological order are 180 degrees apart.

As in the above examples, the subject movement data creation unit 10A may detect movement of the subject in the plurality of partitioned blocks 100 that partition the screen area of the moving images, detect back-and-forth movement of the subject in the moving images on the basis of the movement data, and create a plurality of subject movement data items that specify movement data (for example, the above-described similar movement data, the above-described common movement data or other movement data) in accordance with the period of the detected back-and-forth motion (one period's worth) and corresponding to the back-and-forth motion, and the still image processing unit 10C may cause the image of the still image blocks to move in accordance with movement of the subject specified by the movement data on the still image acquired by the still image acquisition unit, using only the movement data corresponding to back-and-forth movement out of the plurality of subject movement data items created by the subject movement data creation unit 10A.

In addition, the above-described process (for example, see steps S107, S111, S114 and S116) is one example of a process that the subject movement data creation unit 10A accomplishes for detecting the respective movements of the subject in the plurality of partitioned blocks that partition the screen area of the moving images, detecting back-and-forth movement of the subject in the moving images on the basis of the movement data and creating a plurality of subject movement data items in accordance with the period of the detected back-and-forth movement. The period is an integer multiple of the semi-period. Creating a plurality of subject movement data items in accordance with the period of back-and-forth movement means creating a plurality of subject movement data items for movement of the subject within the period, for example. In the above-described embodiment, the period is one period, but in the case of semi-periods, the determination in step S115 may be x≧2. In this manner, when the period changes, the value of x in step S115 may be changed, for example. In addition, the above-described process (for example, see steps S202 through S206, and S207) is one example of a process accomplished by the still image processing unit 10C for causing the image of the still image block to successively move in accordance with the movement data on the still image using the plurality of subject movement data items created by the subject movement data creation unit 10A. When the period of back-and-forth motion is a multiple of the semi-period, for example, steps S202 through S207 are accomplished two or more times in the playback process. In addition, for the even numbered times, the movement data is reversed and the image 201 of the still image block is caused to move. Through this, it is possible to accomplish appropriate back-and-forth motion. In this manner, with the present embodiment it is possible to efficiently express the back-and-forth motion of the subject by detecting and using the back-and-forth motion.

The above-described process (for example, step S111) is one example of a process in which the back-and-forth motion is detected using a reversal in the direction of movement of the subject contained in the movement data. In this manner, with the present embodiment the back-and-forth motion can be detected efficiently.

In addition, the above-described process (for example, see steps S114 through S116) is one example of a process accomplished by the subject movement data creation unit 10A to create a plurality of subject movement data items in accordance with the period of back-and-forth motion going back to the time when the photography unit photographs the still image. Through this kind of process, it is possible to express the latest back-and-forth movement of the subject. This is effective in the cases of movement in which the back-and-forth movement attenuates.

The above-described process may be accomplished using a set of still images in which movement of the subject is discontinuous as another example of moving images. In addition, the moving images may be previously photographed and stored.

Having described and illustrated the principles of this application by reference to one (or more) preferred embodiment(s), it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

What is claimed is:

1. An image processing apparatus comprising:
a subject movement data creation unit that detects movement of a subject in a plurality of partitioned blocks that partition a screen area of a video, detects a partitioned block where there is movement of the subject and detects back-and-forth movement of the subject in the partitioned block using reversal of a movement direction of the subject contained in movement data, and creates a plurality of subject movement data items in accordance with a period of the detected back-and-forth movement;
a still image acquisition unit that acquires a still image; and
a still image processor that causes an image of a still image block corresponding to the partitioned block specified by a plurality of the subject movement data items to move sequentially in accordance with the movement of the subject specified by the subject movement data items, on the still image acquired by the still image acquisition unit, using the subject movement data items created by the subject movement data creation unit.

2. The image processing apparatus according to claim 1, wherein the subject movement data corresponds to movement data specifying the movement of the subject in each partitioned block.

3. The image processing apparatus according to claim 1, further comprising a photography unit;
wherein the still image is photographed by the photography unit; and
wherein the subject movement data creation unit creates the plurality of subject movement data items in accordance with the period of the back-and-forth motion going back to a time when the photography unit photographs the still image.

4. The image processing apparatus according to claim 1, further comprising a photography unit, wherein the video and still images are photographed by the photography unit.

5. The image processing apparatus according to claim 1, further comprising:
a display unit;
wherein the still image processing unit causes the still image to be displayed on the display unit, and causes the images of the still image blocks to move on the still image displayed on the display unit.

6. A non-transitory computer-readable storage medium recording a program that is executable by a computer of an image processing apparatus to function as units comprising:
a subject movement data creation unit that detects movement of a subject in a plurality of partitioned blocks that partition a screen area of a video, detects a partitioned block where there is movement of the subject and detects back-and-forth movement of the subject in the partitioned block using reversal of a movement direction of the subject contained in movement data, and creates a plurality of subject movement data items in accordance with a period of the detected back-and-forth movement;
a still image acquisition unit that acquires a still image; and
a still image processor that causes an image of a still image block corresponding to the partitioned block specified by a plurality of the subject movement data items to move sequentially in accordance with the movement of the subject specified by the subject movement data items, on the still image acquired by the still image acquisition unit, using the subject movement data items created by the subject movement data creation unit.

* * * * *